Patented Sept. 13, 1927.

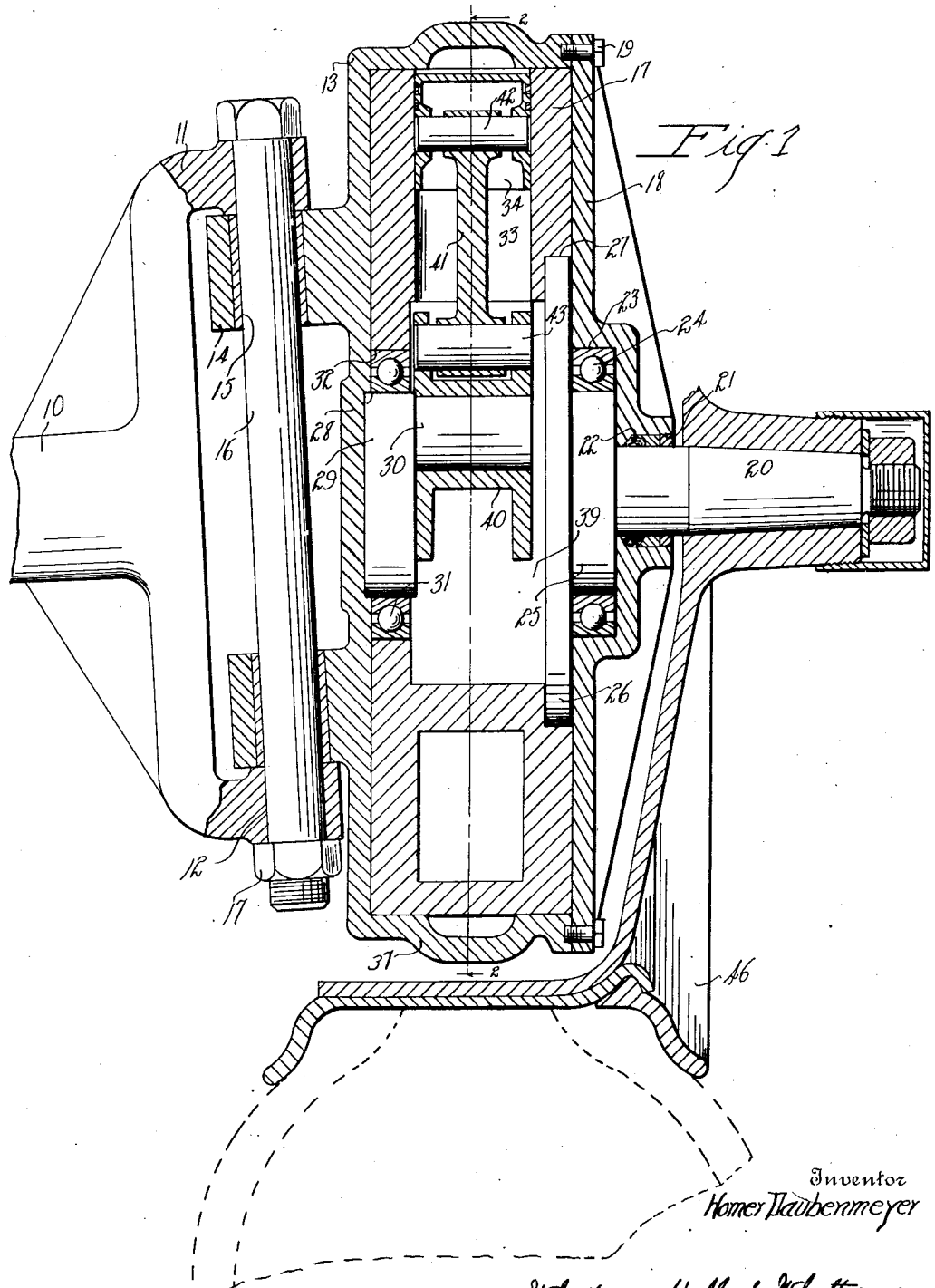

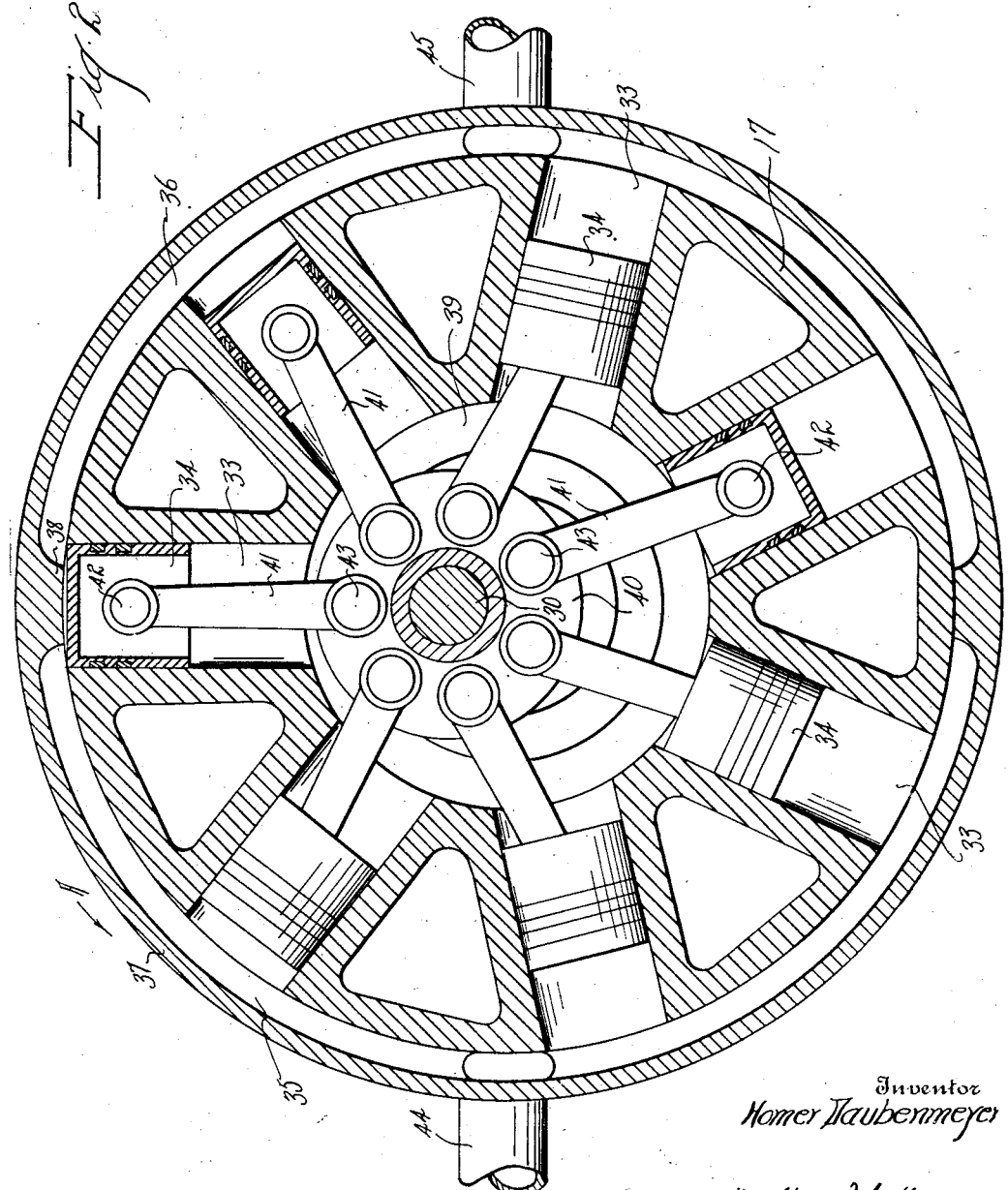

1,642,103

UNITED STATES PATENT OFFICE.

HOMER DAUBENMEYER, OF DETROIT, MICHIGAN.

HYDRAULIC DRIVE FOR VEHICLES.

Application filed December 28, 1925. Serial No. 77,959.

This invention relates to a hydraulic drive for vehicles and more especially to a front wheel drive.

The invention has as one of its primary objects to provide a front wheel hydraulic drive for vehicles distinguished by its simplicity of construction and operation which not only enhances its value both mechanically and commercially but provides a design of a strong and durable nature.

Motor vehicles as now commercially produced require the presence of several gear units interposed between the power plant and the driving wheels; one for the purpose of speed reduction and control and the other for differentially driving the driving wheels. Gear units are not only inefficient because of the loss of power resulting from their use but are also the source of trouble mechanically because of the strains imparted thereto. However, with a power plant producing a substantially constant non-flexible source of power such gear units are necessary and the inefficiency of such an arrangement must be accepted.

However, according to my present invention, I propose associating a power unit with each of the drive wheels, and to use a hydraulic motor for such purposes, eliminating the necessity for gear units with the accompanying inefficiency and providing a flexibility which is conducive of advantages not possible with the above described type of motor vehicle power units.

My invention concerns itself more specifically with that type of drive known as the front wheel drive wherein the steering ground wheels of the vehicle are driven and to this end my invention contemplates a construction wherein a power unit consisting of a hydraulic motor is associated with each wheel and mounted for steering or swiveling movement therewith.

An arrangement of this character offers the possibility of eliminating complicated and inefficient driving connections between the motor and the wheel and renders possible the production of a commercially satisfactory construction which can be cheaply and durably manufactured, assembled and installed.

While in particularizing upon the advantages and features of the present invention particular stress has been placed upon the association of the hydraulic power unit with the front wheels of a vehicle, many of the objects of the invention may be accomplished in a construction wherein the power units are associated with the rear or non-steering wheels of the vehicle and the invention therefore contemplates such an arrangement. Obviously, in a four wheel vehicle four power units constructed in accordance with the invention might, with efficiency, be associated with both the front steering and rear non-steering wheels of the vehicle.

Many of the advantages and much of the commercial value and acceptability of the invention is attributed to the novel construction of the power unit, these advantages being obtained particularly because of the simplicity of the device and the minimum number of parts employed. This enables the power unit to be economically and quickly manufactured and easily assembled and renders the same strong and durable. The invention, therefore, depends, for some of its advantages, upon the specific details of construction illustrated and about to be described.

Other advantages and novel features of construction which contribute materially to the mechanical efficiency of the apparatus also add materially to its commercial value and acceptability and all of the above advantages, objects and structural features of the invention will be made more apparent as this description proceeds especially when considered in connection with the accompany drawings wherein:

Figure 1 is a vertical sectional view through a front wheel drive constructed in accordance with my invention, and, Figure 2 is a sectional view taken substantially on the plane indicated by line 2—2 in Figure 1.

Referring now more particularly to the drawings wherein like reference characters indicate like parts it will be noted that there is illustrated fragmentarily a vehicle front or steering axle 10 having a forked end 11 provided with aligned apertures 12.

Swively connected to the forked end 11 of the axle 10 is a casing or housing 13, the knuckle-joint or swivel connection between these parts being effected by means of a pair of spaced lugs or ears 14 projecting laterally from the casing 13 and also formed with aligned openings properly sleeved as shown at 15 which latter openings together with openings 12 are adapted to receive a king-pin or pivot bolt 16, held in place by means of a nut 17. The structure thus far described is substantially identical with the commercially acceptable types of steering knuckles now universally employed and as the particular design thereof has no special bearing upon the principal features of my invention any desired knuckle-joint or swivel connection between the parts may be utilized.

The casing 13 is adapted to receive a rotor or rotating body 17' mounted for rotation upon the center axis of the casing 13. The outer side of the casing 13 is closed by a cover plate 18 secured in place in any suitable manner, but here shown as by means of bolts 19. Coincident with the central axis of the casing 13 and the rotor 17' is an axle spindle 20 which passes through a flanged opening 21 in the cover plate 18, a suitable packing 22 being arranged between the opening in the cover plate 18 and the axle spindle 20.

The cover plate 18 is formed, also coincident with the axis of the rotor with a shouldered portion 23, forming a raceway for bearings 24 which constitute a direct support for the circumferential bearing shoulder 25 of the spindle supporting disc 26 to which the wheel spindle 20 is preferably integrally connected. This disc 26 in turn reposes in a recess 27 formed in the face of the rotor 17' and is fixed thereto, for rotation therewith, in any suitable manner. The structure just described forms the mounting for the rotor at the outer face thereof.

Mounted at the back wall of the housing 13 and preferably seated in a circular recess 28 thereof is a disc member 29 carrying an eccentrically arranged stub shaft 30. The rotor 17' is suitably recessed adjacent its rear face to accommodate bearings 31 interposed between the disc 29 and the wall 32 of the recessed portion of the rotor. This constitutes the support for the rotor adjacent its rear face.

The rotor 17' is formed with a plurality of radially extending chambers 33 constituting cylinders in which pistons 34 are arranged for reciprocatory movement. These cylinders or chambers 33 open at the outer circumferential ends into circumferential peripherally arranged chambers 35 and 36 formed by outwardly directed enlargements 37 formed in the peripheral wall of the casing 13. The limits of the chambers 35 and 36 are defined by inwardly directed opposed dividing walls 38. The chambers or cylinders 33 open at their inner ends into communication with a space 39 provided by recessing the rotor 17'.

The eccentrically mounted stub shaft 30 projects into the space 39 and has mounted thereon a spool or reel 40. This spool or reel constitutes the connection between the eccentric shaft 30 and the inner ends of the connecting rods 41 of pistons 34, these connecting rods being pivotally connected to the pistons and also to the spool or reel by means of wrist pins 42 and 43 respectively.

The reference character 44 indicates a fluid pressure inlet conduit and 45 an exhaust conduit communicating respectively with the chambers 35 and 36. It is to be understood that the dividing walls 38 engage the periphery of the rotor sufficiently snugly to prevent the passage of fluid from the chamber 35 to the chamber 36 peripherally of the rotor or from the chamber 36 to the chamber 35 peripherally. It should also be clearly understood that while conduit 44 has just been described as a fluid pressure inlet conduit that this conduit may constitute the exhaust conduit while fluid pressure is admitted to the chamber 36 through conduit 45. Obviously in such cases the rotor will be rotated in the opposite direction.

A steering ground wheel is indicated at 46 as mounted upon the wheel spindle or axle 20. Obviously the casing 13 will also have connected thereto a steering arm (not shown) for imparting steering movement thereto and to the wheel 46.

In practice fluid pressure is admitted into chamber 35 through conduit 44 and acting upon the successively receding pistons 34 then in communication with chamber 35, imparts a rotary movement to the rotor 17' in the direction of the arrow A in Figure 2. The fluid entering the cylinders 33 above the pistons 34 will be carried past the lower dividing walls 38 and upon a continued rotation of the rotor will be expelled from the cylinders by the outward movement of the pistons and will be forced out through exhaust conduit 45 communicating with chamber 36. Wheel spindle 20 has a driving connection with the rotor 17 and consequently the rotation of this rotor drives the axle spindle 20 and consequently the wheel 46.

Any desired fluid pressure medium may be employed and will be maintained under pressure in any suitable manner but preferably by a power plant consisting of a motor driven pump or similar mechanism carried by the vehicle. However, with an arrangement such as herein described and illustrated a greater flexibility in the control and driving power is possible as well as the elimination of all gear units. By associating each hydraulic motor directly with the wheel to be driven a direct driving connection between the motor and wheel is possible and the differential movement of the wheels when rounding a curve will be compensated for directly by the motor without the necessity of interposing gearing or other elements capable of compensating for this differential movement.

As described the power unit is of simple construction and of a minimum number of parts, it being noted that the rotor is rotatably mounted at its front face thereof by means of the wheel spindle having a disc portion whereby both the rotor and spindle are supported upon a circumferential annular shouldered portion of the cover plate 18. The rear face of the rotor is recessed to form a raceway for bearings which in turn engage the disc 29 secured to the inside rear face of the casing 13, which disc also constitutes a support for the eccentrically mounted stub shaft 30. Thus a dual function may also be attributed to the disc 29. Furthermore complicated valve arrangements are eliminated and the intake and exhaust chambers associated with the rotor may be conveniently provided by forming the inner face of the peripheral wall of the casing with the opposed dividing walls 38 which together with the periphery of the rotor form the aforesaid intake and exhaust chambers. The whole construction lends itself to economy in construction, simplicity in operation and assembly and to durability.

While one embodiment of the invention has been described herein somewhat in detail the structure shown is for illustrative purposes only and the non-essential details herein shown and described should not be considered as limiting in any respect the essentials and principles of the invention. Furthermore, it may be possible to modify and rearrange the more essential features of the invention without departing from the spirit and scope thereof and to this end reservation is made to make such changes as may come within the purview of the accompanying claims.

What I claim as my invention is:

1. In a front wheel hydraulic drive for vehicles, an axle having a forked apertured end, a hydraulic motor including a casing, an apertured projection on said casing co-operating with said forked axle end for receiving a king-pin for swivelly connecting said casing to said axle, and a steering ground wheel supported upon said casing and having a driving connection with said rotor.

2. In a hydraulic drive for vehicles, an axle, a hydraulic motor mounted directly upon said axle and comprising a casing, a rotor in said casing, an axle spindle supported by said casing and serving as a rotary support for said rotor, and an eccentric stub shaft supported by said casing and serving as a rotary support for said rotor.

3. In a hydraulic drive for vehicles, an axle, a housing supported directly upon said axle, a rotor in said housing, said rotor being formed with a plurality of radially extending cylinders with pistons reciprocable therein, an eccentrically arranged member to which the connecting rods of said cylinders are connected, an eccentric stub shaft for said eccentrically mounted member, an axle spindle having a driving connection with said rotor, said axle spindle and stub shaft being supported by said casing and means for rotatably mounting said rotor on said spindle and stub shaft.

4. In a hydraulic power unit for use in connection with vehicles including an axle and a ground wheel, a housing, a rotor in said housing, an axle spindle having a driving connection with said rotor and provided with a shouldered portion, said housing being off-set to form a circumferential raceway and bearings in said raceway for supporting said wheel spindle shoulder whereby said rotor is rotatably supported at one side thereof and means secured to the opposed side of said housing for rotatably supporting the other side of said rotor.

5. In a hydraulic drive for vehicles, an axle, and a power unit directly supported by said axle comprising an open-sided casing directly connected to said axle, a cover plate for closing the open side of said casing, a rotor enclosed by said casing, an axle spindle rotatably supported in said cover plate and rigidly connected to said rotor and constituting a rotary support therefor, means projecting from the opposed side of said casing into a recessed portion of said rotor and constituting a rotary support for said rotor.

6. In a front wheel hydraulic drive for vehicles, an axle, and a hydraulic motor including a casing having spaced lugs projecting laterally therefrom and co-operating with said axle for receiving a king-pin for swivelly connecting said casing to said axle.

In testimony whereof I affix my signature.

HOMER DAUBENMEYER.